F. M. BERBERICH.
METHOD OF MILKING COWS.
APPLICATION FILED NOV. 25, 1908.

942,243.

Patented Dec. 7, 1909.

Witnesses:
George Radson
Wells L. Church

Inventor,
Franz M. Berberich.
By Bakewell & Cornwall
Attys

UNITED STATES PATENT OFFICE.

FRANZ MAX BERBERICH, OF KIEL, GERMANY.

METHOD OF MILKING COWS.

942,243.  Specification of Letters Patent.  Patented Dec. 7, 1909.

Application filed November 25, 1908. Serial No. 464,427.

*To all whom it may concern:*

Be it known that I, FRANZ MAX BERBERICH, a citizen of the German Empire, residing at Kiel, Germany, have invented a certain new and useful Improvement in Methods of Milking Cows, of which the following is a full, clear, and exact description, such as will enable others skilled in the art to which it appertains to make and use the same, reference being had to the accompanying drawings, forming part of this specification, in which—

Figure 1:
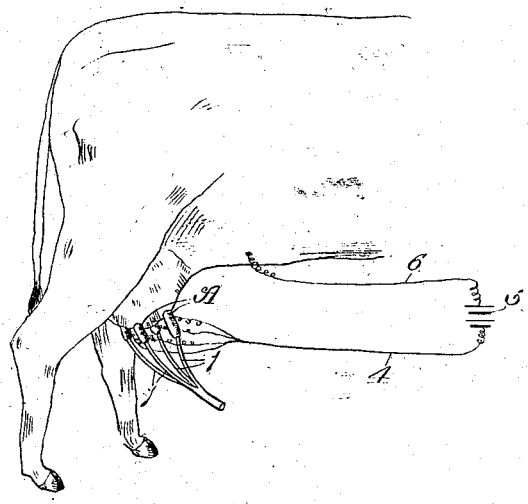
Figure 2:
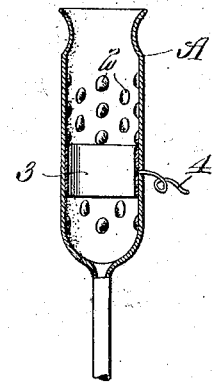

Figure 1 is a view illustrating an apparatus for carrying out my method, applied to a cow; and Fig. 2 is a vertical sectional view of one form of teat cup that can be used with said apparatus.

This invention relates to a novel method of milking cows.

It is well-known that the sucking of a calf is the most perfect manner of milking and produces a greater yield of milk than hand milking. This is due partly to the fact that by the exertion of the muscles of the suckling calf light or weak currents of electricity are generated which are transmitted to the cow's udder and milk glands so that the milk flows freely and more abundantly, and partly to the fact that the action of the rough tongue of the calf on the teats on the cow's udder massages same and has a reflex action on the muscles of the cow which causes the milk to continue to flow freely.

The object of my present invention is to provide a method of milking cows that will produce practically the same effect on a cow as the sucking of a calf.

Briefly described, my method consists in subjecting a cow to a slight electric shock to cause the milk to flow freely, and pressing the teats on the cow's udder so as to produce a reflex action on the muscles of the cow.

In Fig. 1 of the drawings I have illustrated one form of apparatus that can be employed for practicing my method, and referring to said figure, A designates teat cups that are preferably made of rubber and which are connected to tubes 1 that lead to a pumping apparatus, not shown. The inside faces of the teat cups are roughened or provided with protuberances 2, as shown in Fig. 2, and each of said cups is preferably provided on its inner face with a metal contact 3 which can consist of a ring or lining of metal, such, for example, as tinfoil. A wire 4 which leads from a battery 5 or any other suitable means for generating a current of electricity, is connected to the metal contact 3 on the inside of each teat cup and the other wire 6, which leads from said battery, contacts with some part of the cow's body so as to complete the circuit, and thus cause an electric current to pass through the milk veins and glands of the cow so as to cause the milk to flow freely. The protuberances or roughened surfaces on the interior of the teat cups press on the teats which said cups surround when a vacuum is created in the tubes 1 and thus produce a reflex action on the muscles of the cow which causes the milk to continue to flow freely. Any preferred kind of teat cups can be used and the conducting wires 4 and 6 can contact with various parts of the cow's body as, for example, the udder, escutcheon, back and milk veins.

In practicing my improved method I prefer to use a very light, simple, direct current, although in some instances an interrupted or alternating current may be advantageously employed.

I prefer to subject the teats on the cow's udder to a pressing and sucking action at the same time the cow is electrified but, if desired, the cow can be electrified before the milking operation.

Various kinds of milking machines can be used for practicing my method so that I do not wish it to be understood that my method is limited to any particular type of milking machine.

Having thus described my invention, what I claim as new and desire to secure by Letters Patent, is:

1. A method of milking a cow which consists in subjecting the cow to a slight electric shock so as to cause the milk to flow freely and simultaneously pressing the teats on the cow's udder so as to produce a reflex action on the muscles of the cow; substantially as described.

2. A method of milking a cow which consists in subjecting the cow to a slight electric shock, and subjecting the teats of the cow's udder to a combined pressing and sucking action; substantially as described.

3. The herein-described method of milking a cow, which consists in applying teat cups to the teats of the cow's udder, creating suction within said teat cups and simultaneously subjecting the cow's udder to a slight electric shock.

In testimony whereof I hereunto affix my signature in the presence of two witnesses, this tenth day of November 1908.

FRANZ MAX BERBERICH.

Witnesses:
    HUGO LIEBELT,
    FERDINAND ROHWEDLOLER.